United States Patent [19]

Owens, Jr.

[11] 3,863,099

[45] Jan. 28, 1975

[54] ELECTROMAGNETIC DEFLECTION DISPLAY SYSTEM INCLUDING DUAL MODE DEFLECTION AMPLIFIERS AND OUTPUT POWER LIMITED POWER SUPPLIES

[75] Inventor: Abner Owens, Jr., Pompton Lakes, N.J.

[73] Assignee: The Benedix Corporation, Teterboro, N.J.

[22] Filed: June 28, 1973

[21] Appl. No.: 374,736

[52] U.S. Cl. ............ 315/383, 178/7.5 R, 315/160, 315/365, 315/387, 315/393, 315/395

[51] Int. Cl. ............................................ H01j 29/70

[58] Field of Search ............ 315/18, 19, 20, 22, 26, 315/27 R, 27 TD, 160; 178/6.8, 7.5 R; 340/324 AD; 179/3

[56] References Cited

UNITED STATES PATENTS

| | | | |
|---|---|---|---|
| 3,499,979 | 3/1970 | Fiorletta et al. | 315/27 TD |
| 3,602,768 | 8/1971 | Williams | 315/27 TD |
| 3,751,706 | 8/1973 | Owens | 315/27 TD |

*Primary Examiner*—Maynard R. Wilbur
*Assistant Examiner*—Joseph M. Potenza
*Attorney, Agent, or Firm*—Anthony F. Cuoco; S. H. Hartz

[57] ABSTRACT

An electromagnetic deflection display system for both random stroke and raster displays provides larger, faster and brighter displays with reduced power consumption and physical size. Dual mode deflection amplifiers having independent linear and slew characteristics provide reduced slewing time without any significant increase in power consumption and system power is limited to a predetermined average value to reduce system size and weight.

6 Claims, 8 Drawing Figures

ELECTROMAGNETIC DEFLECTION DISPLAY SYSTEM INCLUDING DUAL MODE DEFLECTION AMPLIFIERS AND OUTPUT POWER LIMITED POWER SUPPLIES

BACKGROUND OF THE INVENTION

1. Field of the Invention

This invention relates generally to display systems and particularly to display systems with electromagnetically deflected cathode ray tube random stroke and TV raster displays. More particularly, this invention relates to systems of the type described including dual mode deflection amplifiers for reducing slewing time with significantly increasing power consumption such as claimed in copending U.S. application Ser. No. 374,730 filed on June 28, 1973 by Abner Owens, Jr. and Donald Weinstein, and power supplies which are output power limited for reducing quiescent system power consumption as well as the size and weight of the system such as claimed in U.S. application Ser. No. 374,735 filed on June 28, 1973 by Abner Owens, Jr., both of said application being assigned to The Bendix Corporation, assignee of the present invention.

2. Description of the Prior Art

Of major concern in electromagnetically deflected cathode ray tube (CRT) display systems is the significant increase in power consumption with larger, faster and brighter displays. These items become even more critical with the highly sophisticated airborne navigation displays required in modern, high speed aircraft, where size, weight and power are at a premium.

The choice of deflection type for a given display system is a function of three major factors: (a) the CRT light output requirement, and hence the final CRT anode voltage, (b) the deflection angle, which is a function of the maximum available CRT length and packaging geometry, and (c) the maximum allowable power dissipation. The primary requirement for the deflection amplifiers for an electromagnetically deflected CRT is that of supplying accurately controlled currents to the deflection yokes. For apparatus which serves this purpose reference may be had to U.S. Pat. No. 3,426,245 issued Feb. 4, 1969 to John F. Yurasek and Abner Owens, Jr. for a High Speed Magnetic Deflection Amplifier, and assigned to The Bendix Corporation, assignee of the present invention.

An additional area of concern is the slew rate of the deflection amplifiers. Amplifier slew rate design criteria (which also affect peak power requirements) are dictated primarily by display content and format requirements and may be relaxed by minimizing the amount of information to be presented by the display at any one time. In this connection reference may be had to U.S. Pat. No. application Ser. No. 112,358 filed Feb. 9, 1971 by Abner Owens, Jr. and Donald Weinstein for Means for Conserving Energy During Line Retrace of a Raster Type Display, and which application is assigned to The Bendix Corporation, assignee of the present invention.

The present invention describes a system including slewing means whereby power may be significantly reduced for any type of display i.e., periodic or aperiodic. The system includes fast slewing switching dual mode deflection amplifiers and output power limited power supplies to achieve the desired results with reduced power consumption and reduced weight and size.

SUMMARY OF THE INVENTION

This invention contemplates an electromagnetic deflection display system wherein input signals from, for example, a symbol generator are applied to deflection amplifiers, and which amplifiers drive X and Y deflection yokes of a CRT. The deflection amplifiers are of the dual mode type having independent linear and slew modes of operation and with three distinct stages, i.e., a preamplifier stage, a fast slew switching stage and an output stage. The amplifiers are powered by power supplies which operate at predetermined duty cycles whereby the power to the system is at a predetermined average value. The system features larger, faster and brighter display presentations while achieving significant reduction in system power consumption and physical size.

The main object of this invention is to provide an electromagnetic deflection display system providing larger, faster and brighter displays with significant reductions in total system power consumption and physical size.

Another object of this invention is to provide an electromagnetic deflection display system of the type described for both random stroke writing and TV raster displays, and having dual mode deflection amplifiers and output power limited power supplies, with system power consumption and weight and size significantly reduced.

Another object of this invention is to provide a system of the type described including dual mode deflection switching amplifiers having independent linear and slew characteristics whereby the slewing time is reduced without a significant increase in power consumption.

Another object of this invention is to provide a system of the type described including power supplies where the power to the system is limited to a predetermined average value to reduce the quiescent power consumption of the system and significantly reduce system, size and weight.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE INVENTION

Figure 1:
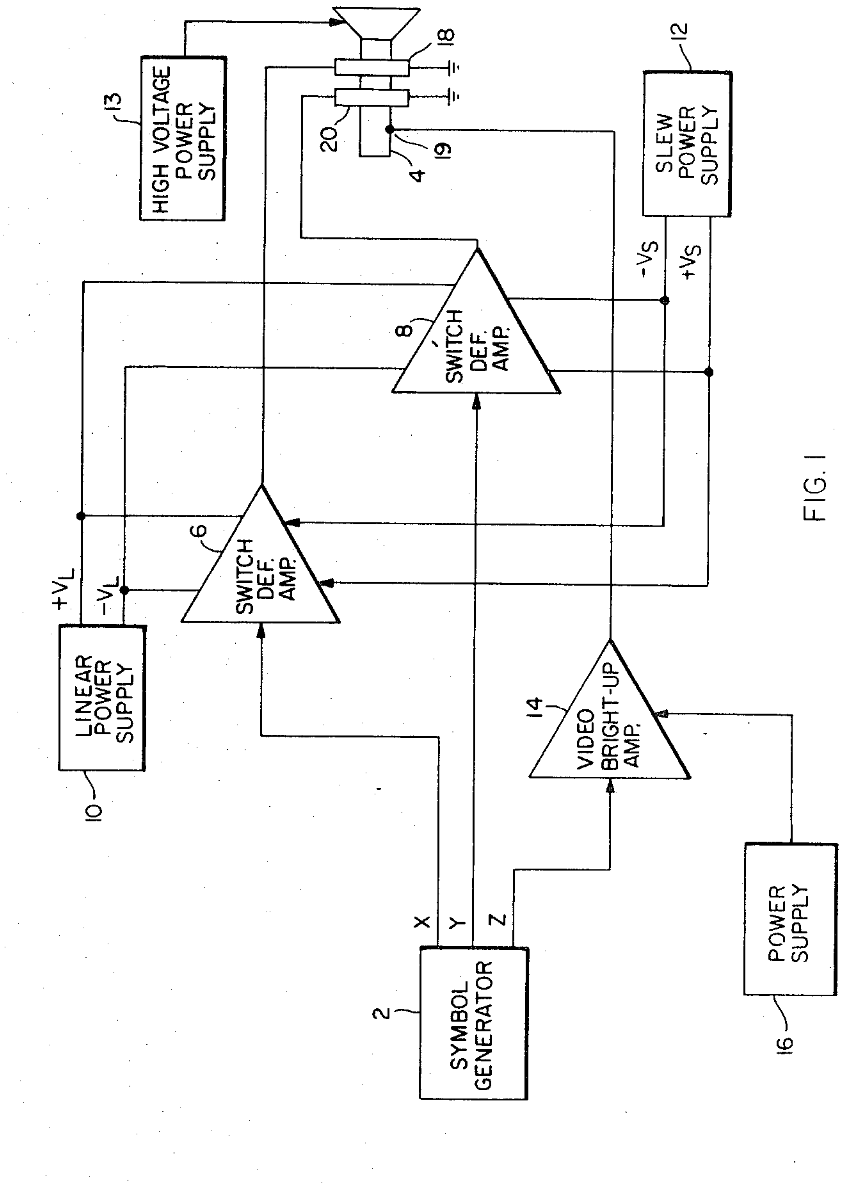
FIG. 1 is a block diagram of an electromagnetic deflection display system according to the invention.

With reference to FIG. 1, a symbol generator 2 provides X and Y cathode ray tube (CRT) deflection signals and a Z bright-up signal. Symbol generator 2 is of the type described in copending U.S. application Ser. No. 152,927 filed on June 14, 1971 by Kenneth J. Kendall et al, and assigned to The Bendix Corporation, assignee of the present invention. It will suffice to say for purposes of the present invention that the X, Y and Z signals from symbol generator 2 are applied to the appropriate circuits of a CRT 4 for providing symbology on the face of the CRT in response to signals from an external source, and which symbology may be used for flight control purposes.

Signal X from symbol generator 2 is applied to a switching deflection amplifier 6 and signal Y from the symbol generator is applied to a similar switching deflection amplifier 8. Switching deflection amplifiers 6 and 8 are of the type which will be hereinafter described with reference to FIG. 2. The switching amplifiers are powered by a linear power supply 10 providing voltages $+V_L$ and $-V_L$ and a similar slew power supply 12 providing voltages $+V_S$ and $-V_S$. Power supplies 10 and 12 are of the type which will be hereinafter described with reference to FIG. 5.

The Z signal from symbol generator 2 is applied to a conventional type video bright-up amplifier 14. Amplifier 14 is powered by a conventional power supply 16.

Switching deflection amplifier 6 is connected to an X-axis deflection yoke 18 of CRT 4 and switching deflection amplifier 8 is connected to a Y-axis deflection yoke 20 of the CRT. Video bright-up amplifier 14 is connected to an appropriate bright-up electrode 19 of CRT 4. CRT 4 is powered by a conventional high voltage power supply 13.

It will now be understood that the electromagnetic deflection system shown in FIG. 1 is effective for both random stroke writing and TV raster displays. Amplifiers 6 and 8 are dual mode deflection amplifiers having independent linear and slew characteristics, whereby the slewing time may be significantly reduced as compared to a non-dual arrangement, with no significant increase in power consumption as will be hereinafter explained. Power supplies 10 and 12 are of the type whereby the output power of the system is limited to a prescribed average value thus reducing system quiescent power consumption of the deflection system to significantly reduce the size and weight of the system as will also be hereinafter explained.

It will be understood that CRT display edge to edge slew time varies anywhere from 100 microseconds to 1 microsecond depending on (a) whether the display is random stroke writing/symbology or of the TV raster type and (b) the display content and format. The above, of course, implies nonstorage type displays with frame rates in the order of 50 Hz. to 60 Hz. In random stroke type displays, as display content increases so must the slew rate. In the TV raster type display, slewing is the flyback time, which increases with an increase in the number of TV lines per frame. In the dual mode deflection system of the present invention the slewing mode requirement is virtually independent of the linear mode requirement as will become evident.

Thus, with reference to FIG. 2 when an amplifier such as the amplifiers 6 and 8 will be described, the amplifier includes a preamp stage 22, a switching stage 26 and an output or emitter follower stage 28.

Preamp stage 22 includes a very wide band high gain operational amplifier 30 having an input terminal 32 at which an input signal A is received through a resistor 34 and a grounded input/output terminal 36. Amplifier 30 has an output terminal 38 at which a signal B is provided. A feedback loop including a resistor 40 and a serially connected variable capacitor 42 is connected to input terminal 32 and to output terminal 38 of amplifier 30.

Output terminal 38 of amplifier 30 in preamp stage 22 is connected to an input terminal 44 of a switching amplifier 46 in switching stage 26. Amplifier 46 includes a power terminal 48 connected to a slew power supply, such as the power supply 12, (FIG. 1) for receiving voltage $+V_S$ and a power terminal 50 connected to power supply 10 for receiving voltage $-V_S$. Amplifier 46 includes an output terminal 52 at which a signal C is provided. Switching stage 26 includes transistors 54 and 60.

Output stage 28 includes transistors 56 and 58. The base element of transistors 54 and 60 are connected intermediate output terminal 38 of amplifier 30 and input terminal 44 of amplifier 46. The base elements of transistors 56 and 58 are connected to output terminal 52 of amplifier 46. The emitter element of transistor 54 is connected to power terminal 48 of amplifier 46 and the emitter element of transistor 60 is connected to power terminal 50 of amplifier 46. The collector elements of transistors 54 and 56 are connected one to the other and the collector elements of transistors 58 and 60 are connected one to the other. The emitter elements of transistors 56 and 58 are connected one to the other and a signal D is provided at a point 62 intermediate said emitter elements.

Voltage $+V_L$ from power supply 10 is applied through a steering diode 62 to the collector elements of transistor 54 and 56 and voltage $-V_L$ from the power supply is applied through a steering diode 66 to a point 65 intermediate the collector elements of transistors 58 and 60. A deflection yoke such as the deflection yoke 18, 20 (FIG. 1) and shown for purposes of illustration as yoke 18 includes a coil 70, a resistor 71 and a current sampling resistor 72 connected in series. Coil 70 is connected to point 62. A feedback resistor 74 is connected intermediate resistor 34 and input 32 of amplifier 30 and is connected to a point 76 intermediate resistors 71 and 72, and at which point 76 a signal E is provided. Waveforms for signals A, B, C, D and E are shown in the graphical illustration of FIGS. 4A–4B, and which figures will be hereinafter referred to.

The band width of amplifier 30 is a function of overall display system requirements which may vary from 60 Hz. to 10 MHz. The feedback loop including resistor 40 and capacitor 42 around amplifier 30 controls the response shape with respect to yoke shape while maintaining high DC feedback for position stability. This is accomplished by adjusting the RC time constant of the feedback loop to cause a zero to occur at the pole caused by the yoke time constant. Therefore, during the linear mode of operation the deflection amplifier is extremely stable since yoke 18, which is a linear-passive element, and not the amplifier, will cause a natural roll-off of 6DB per octave in the system. In the linear mode the maximum linear band width of amplifier 30 is essentially a function of yoke inductance, the positive and negative power potentials and the input voltage amplitude.

Figure 2:
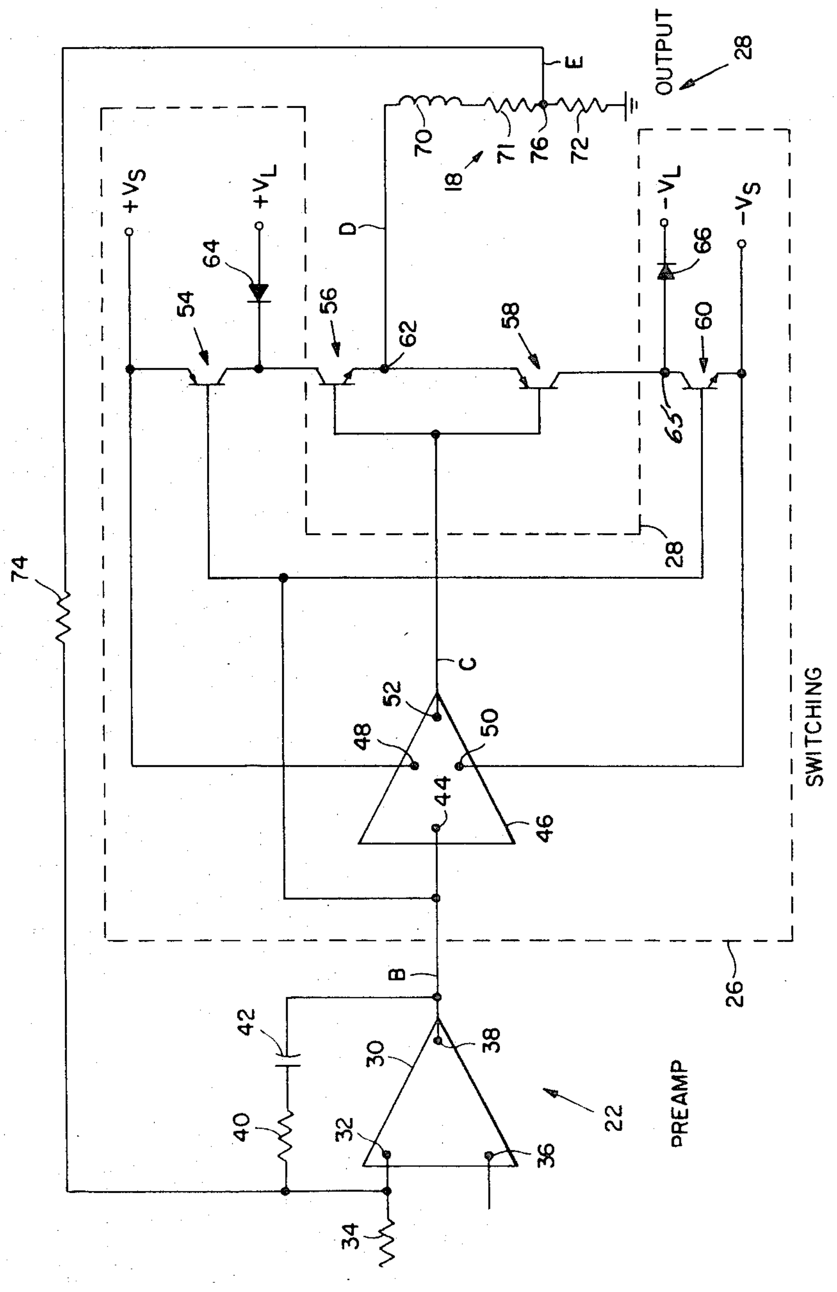
FIG. 2 is an electrical schematic diagram of the dual mode switching deflection amplifiers shown generally in FIG. 1.
Figure 3:
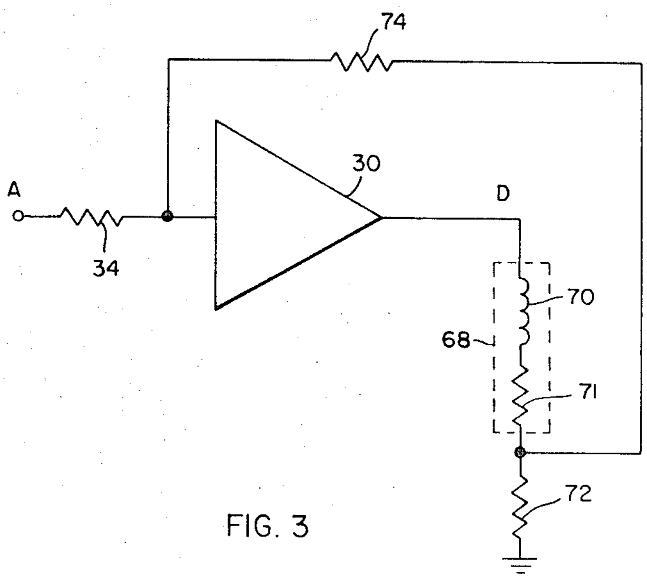
FIG. 3 is an electrical schematic diagram showing a linear model of the amplifiers shown schematically in FIG. 2.

With reference to FIG. 3 which is a linear model of the deflection amplifier shown in schematic form in FIG. 2, a relationship involving the pertinent parameters may be determined as follows:

$$D = A\, R_{74}/R_{34} \sqrt{(R_{72}+R_{71})^2+(\omega_0 L_{70})^2} \tag{1}$$

Equation (1) may be normalized for more general use as follows:

$$D/A \cong R_{75}/R_{34} \sqrt{1+(\omega_0/\omega_L)^2} \tag{2}$$

where: $D = \pm V$ $R_2/R_1$ = closed loop gain $\omega_0$ = input frequency $\omega_L$ = yoke time constant (−3DB point)

From equation (2) it can be seen that with $\omega_0 \leq \omega_L$, D/A is essentially equal to $R_{74}/R_{34}$ and the amplifier closed loop gain is in the order of from 0.1 to 0.5 for this type of amplifier.

It will now be understood that as input frequency ($\omega_0$) increases beyond ($\omega_L$) and holding A constant, D rises to the power of two. This is, of course, due to the induction reactance of yoke 18.

From FIG. 2 it can be seen that D is equivalent to the supply potentials $\pm V_L$. Therefore, the maximum linear large signal bandwidth of the deflection amplifier is readily predictable, i.e., knowing the closed loop gain $R_{24}/R_{34}$, yoke time constant $\omega_L$ and setting A to maximum (usually ±5 volts) with $D = \pm V$, $\omega_0$ may be determined. For maximum linear small signal bandwidth one would simply adjust A to the smallest excusion applicable to the specific system.

As the input frequency and amplitude go beyond the maximum linear large signal bandwidth limits, the deflection amplifier as shown in FIG. 2 is said to go into the slew or non-linear mode. While slewing, the output current waveform of the amplifier no longer represents the input voltage waveform, and the amplifier effectively becomes open loop and saturates.

Figures 4A, 4B:
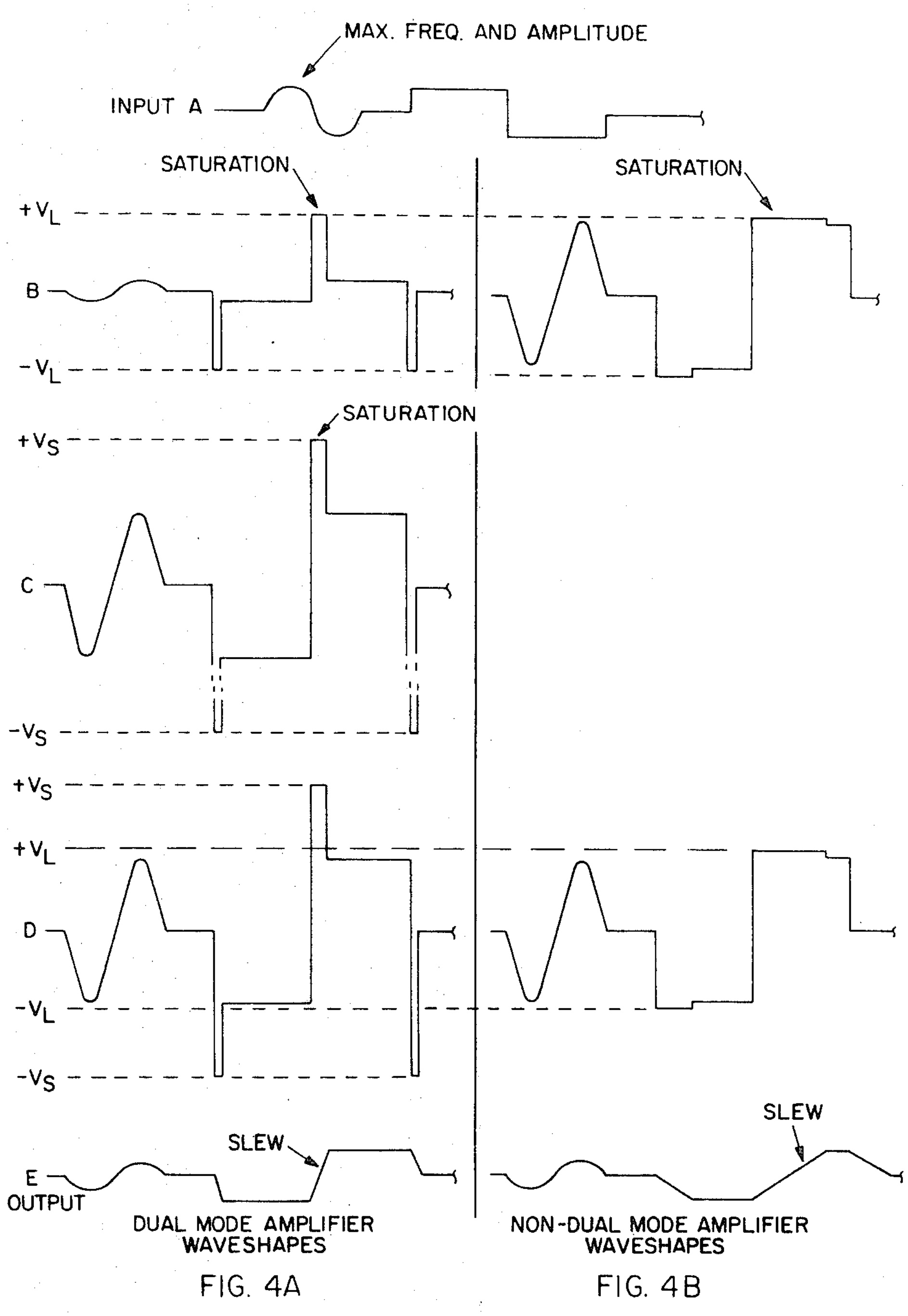
FIGS. 4A–4B are graphical representations showing waveforms at various points of dual mode (FIG. 2) and non-dual mode deflection amplifiers, respectfully.

FIG. 4A illustrates voltage waveforms within the dual mode deflection amplifier of the invention (FIG. 2) while FIG. 4B shows the waveforms of the same amplifier with the switching stage 26 removed. Thus, with the switching stage removed the slewing time is not independent of the linear mode of operation but is dependent on the potential $\pm V_L$ as shown in FIG. 4B. If the linear signal bandwidth requirement is low, $\pm V_L$ will be relatively low and the slew time will be long which may not be desirable. Increasing $\pm V_L$ to decrease the slewing time will increase the large signal bandwidth unnecessarily and, more significantly, increase the system power consumption.

A typical situation in which the aforenoted is obvious is in the horizontal sweep voltage of a TV raster display where the linear sweep time is about 85 percent longer than the slewing or flyback time. In the dual mode deflection amplifier of the present invention, the potential $\pm V_L$ is chosen for the maximum large signal bandwidth while the switched input potential $\pm V_S$, which may be much higher than $\pm V_L$, is selected for the slewing time requirements see (FIGS. 2 and 4A). Voltage $\pm V_S$ is determined by the following equation.

$$\pm V_S = LI/T, \text{ where} \tag{3}$$

$L$ = yoke inductance $I$ = yoke current maximum deflection, center to edge $T$ = slew time required Referring to FIGS. 2 and 4A, the dual mode deflection amplifier such as the amplifiers 6 and 8 of the invention operates as will be next described.

When input signal A exceeds the linear bandwidth and amplitude, the dual mode deflection amplifier effectively becomes open loop as heretofore explained. Preamp stage 22 then saturates going far beyond the design linear region to provide waveform B in FIG. 4A. This action also causes stage 26 to saturate to the high switching voltage $\pm V_S$ to provide waveform C. At the same time the output of the switching stage applies voltage $\pm V_S$ to the bases of the output stage transistors 56 and 58 and the preamp saturation causes transistors 54 and 60 to saturate applying $\pm V_S$ to the collectors of transistors 56 and 58 respectively. As the collectors of transistors 56 and 58 rise to $\pm V_S$, diodes 64 and 66 become reverse biased and disconnect the linear power supply $\pm V_L$. The rise and fall time of waveform E shown in FIG. 4B decreases significantly to that shown in FIG. 4A. Using this technique, slew time may be reduced by a minimum of five times that of the non-dual approach without any increase in system power as will now be understood.

The electromagnetic deflection display system and the dual mode switching amplifier apparatus heretofore discussed offers a significant reduction in system power requirements. The power supply of the invention which will be next described operates at predetermined duty cycles and provides still further reductions in system power and physical size of the equipment involved.

The equipment involved will be described, for purposes of illustration, with reference to TV raster and random stroke writing type display systems such as used in aircraft head-up or head-down displays or simulators. It will be understood that these systems imply a non-storage type display with refresh rates in order of 60 Hz. Further, in analyzing these systems certain predictions can usually be made with respect to the display formats. With TV raster display there is, of course, the raster format which is accurately predictable at any instant i.e., the linear sweep in either the vertical or horizontal and the slew during the respective flybacks. The random stroke format is more difficult to predict except for the refresh rate. However, more often than not some generalities can be attributed to most random stroke displays other than the refresh rate. For example, in a random stroke system the CRT electron beam will not stay positioned in one corner of the display for more than one millisecond. As a matter of fact, in most systems the CRT phosphor protection device will sense no motion within this one millisecond period which could present a display problem, and the CRT beam is turned off. Essentially, then, the length of time that the CRT electron beam is along the outer perimeter of the display surface will determine peak power duration for the random stroke system. The same analysis may be made for the TV raster mode of operation. Thus, it appears that since peak power is required only for short periods of maximum deflection, and the power requirements decrease to much lower than peak for a larger portion of the frame time, it is desirable to develop a power supply system to fulfill these requirements.

With this in mind, the power supply systems of the present invention have been designed with maximum output power equal to the average power requirements of the system. Thus, there is provided a significant reduction in quiescent power, heat generated, and system size and weight.

Figure 5:
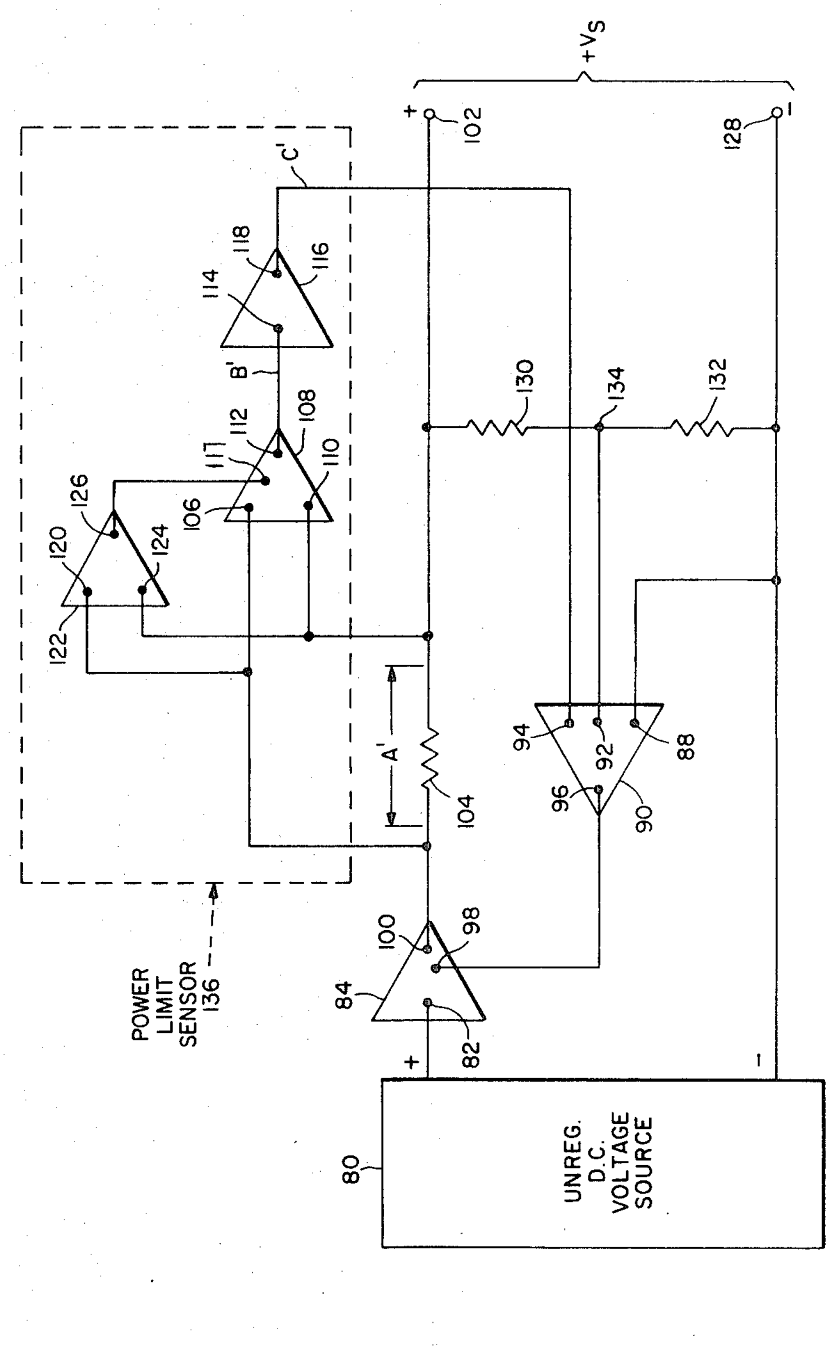
FIG. 5 is an electrical schematic diagram of the output power limited linear and slew power supplies shown generally in FIG. 1.

FIG. 5 shows in substantial detail a power supply according to the invention such as the power supplies shown generally in FIG. 1 and designated by the numbers 10 and 12, and wherein power supply 12 providing signal $+V_S$ will be described for purposes of illustration, with another such power supply being required for providing signal $-V_S$.

An unregulated d.c. voltage source 80 shown in FIG. 5 provides a positive voltage (+) which is applied to an input terminal 82 of a current amplifier 84, and provides a negative voltage (−) which is applied to an input terminal 88 of a correction amplifier 90. Correction amplifier 90 has other input terminals 92 and 94 and an output terminal 96 connected to a control terminal 98 of current amplifier 84. Current amplifier 84 has an output terminal 100 connected to a power source terminal 102 through a current sampling resistor 104.

Output terminal 100 of current amplifier 84 is connected to an input terminal 106 of an integrating amplifier 108. An input terminal 110 of amplifier 108 is connected to power output terminal 102. Amplifier 108 has an output terminal 112 connected to an input terminal 114 of a comparator amplifier 116. Comparator amplifier 116 has an output terminal 118 connected to input terminal 94 of correction amplifier 90.

Output terminal 100 of current amplifier 84 is connected to an input terminal 120 of a zero sensor 122 and another input terminal 124 of zero sensor 122 is connected to power output terminal 102. Zero sensor 120 has an output terminal 126 connected to a control terminal 117 of integrator 108.

A power supply return terminal 128 is connected to DC voltage source 86 and serially connected resistors 130 and 132 are connected across terminals 102 and 128. Input terminal 92 of correction amplifier 90 is connected at a point 134 intermediate resistors 130 and 132. Integrator 108, zero sensor 122 and comparator amplifier 116 are included in a power limit sensor designated generally by the number 136.

In operation, the voltage developed across current sampling resistor 104 is a function of the current flowing through the resistor. This voltage waveform is integrated by integrator 108 in power limit sensor 136, whose maximum rate is a function of how long the CRT electron beam is at maximum deflection. If this time is exceeded, the integrator will reach a voltage level at which comparator 116 will trigger and command the power supply to shut down. Each time the voltage across current sampling resistor 104 is zero as sensed by zero sensor 122, or at some predetermined quiescent level, integrator 108 is reset to zero thus preventing the integrator from reaching trigger levels during small quiescent levels. Hysteresis of comparator 116 prevents instability or oscillations from occurring.

From the configuration shown in FIG. 5, it will be understood that power limit sensor 136 may be used as short circuit protection circuitry and the system will keep recycling on a short circuit. Resistors 130 and 132 and correction amplifier 90 provide a positive feedback network as is shown in the figure.

For a deflection system such as shown in FIG. 1, there are four power supplies (two power supplies 10 and two power supplies 12) such as the power supply shown in FIG. 5, two for the linear mode and two for the slew mode. It will be understood that any number of power supplies, may be used as well, depending on the specific format of the display. The linear power supplies will always be of the type described with reference to FIG. 5. However, if there are no system slew requirements the slew power supplies are not necessary. Also, in some systems the only slew requirement is during the retrace or flyback of the horizontal sweep of the TV raster, and thus the slew mode is only required in the negative direction and a power supply providing voltage $-V_S$ is the only one necessary.

Figure 6:
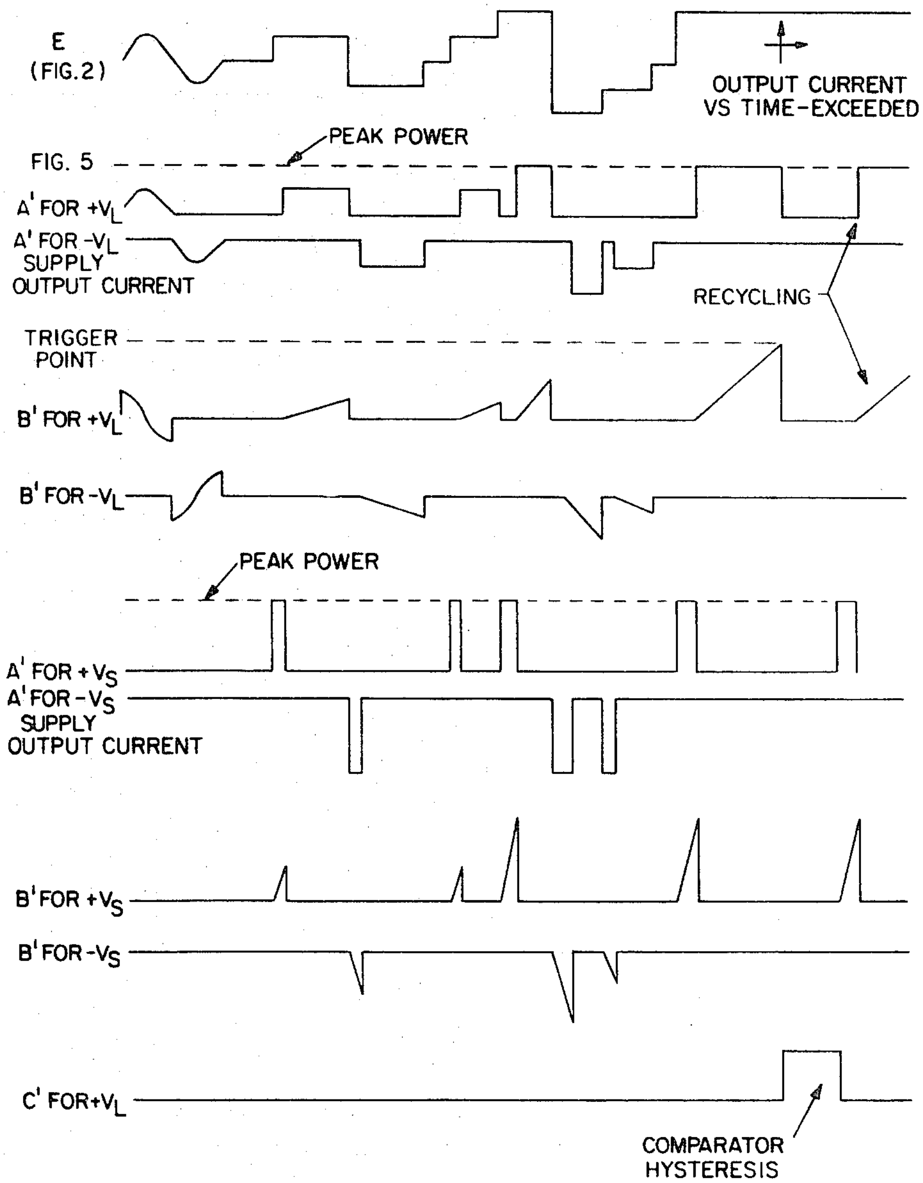
FIG. 6 is a graphical representation showing waveforms at various points of the power supply shown schematically in FIG. 5.

FIG. 6 illustrates waveforms for signals at various points of the power supply described with reference to FIG. 5, and which signals are designated in FIGS. 5 and 6 as A', B' and C'. It should be noted from waveform A' of FIG. 6, that relative average power is low and durations of peak power are relatively small. Some typical values of peak output ratios are; for $\pm V_L$, about 30 percent of peak and for $\pm V_S$, about 16 percent of peak.

Figure 7:
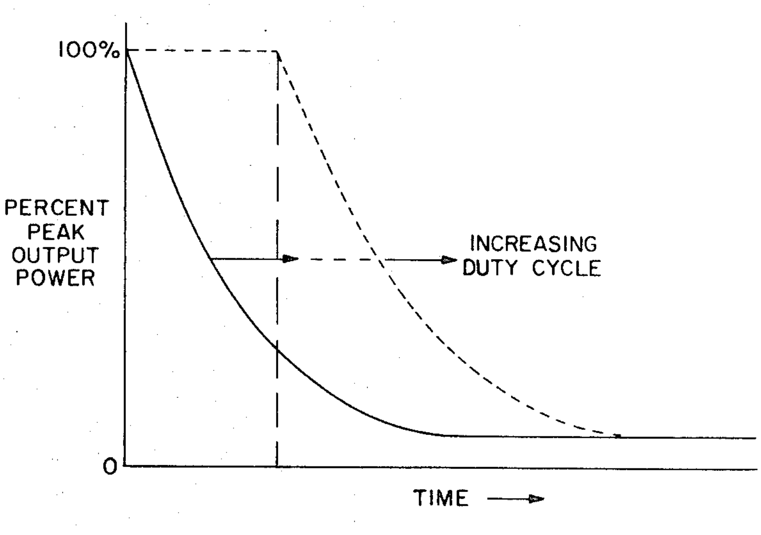
FIG. 7 is a graphical representation showing output power characteristics versus time of the power supply shown schematically in FIG. 5.

FIG. 7 is a graphical illustration showing the output power characteristics versus time of the power supply concept of the invention. The curve of FIG. 7 basically follows the square law; the plateau at 100 percent power output is a function of the duty cycle of the system and as the duty cycle increases the curve moves in the direction of the arrow.

It will now be seen that the aforementioned objects of the invention have been satisfied. An electromagnetic deflection display system for both random stroke writing and TV raster displays including dual mode deflection amplifiers (linear and slew) and output power limited power supplies contribute to decreased power consumption and system weight and size. The dual mode deflection amplifiers have independent linear and slew characteristics to provide reduced slewing time with no significant increase in power consumption. The output power limited power supply system, in limiting system power to a predetermined average value, reduces the quiescent power consumption of the system and further reduces system size and weight.

Although but several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An electromagnetic deflection display system, comprising:

means for providing deflection signals;

deflection display means;

power supply means providing linear mode output power and slew mode output power for powering the deflection display means, said power supply means operating at a predetermined duty cycle with the output power therefrom being at a predetermined average value; and deflection amplifier means connected to the deflection signal means, the power supply and the display means, and operative in a linear mode for initially applying the linear mode output power to the deflection display means and responsive to a rate of change of the deflection signals above a predetermined rate for switching to a slew mode of operation to apply the slew mode output power to the deflection display means, said linear and slew modes being independent of each other for reduction slew time without increasing power consumption.

2. An electromagnetic deflection display system as described by claim 1, wherein the power supply means includes:

means for providing linear mode output power at predetermined levels in one sense and in an opposite sense; and means for providing slew mode output power at predetermined levels in one sense and in an opposite sense.

3. An electromagnetic deflection display system as described by claim 1, wherein the power supply means includes:

means for providing linear mode output power at predetermined levels in one sense and in an opposite sense.

4. An electromagnetic deflection display system as described by claim 1, wherein the power supply means includes:

means for providing linear mode output power at predetermined levels in one sense and in an opposite sense; and means for providing slew mode output power at a predetermined level in one sense.

5. An electromagnetic deflection display system as described by claim 1, wherein:

the means for providing deflection signals includes means for providing X-axis deflection signals and means for providing Y-axis deflection signals;

the deflection display means includes X-axis deflection means and Y-axis deflection means; and the deflection amplifier means includes means having independent linear and slew modes of operation and operative in the linear mode for initially applying the linear mode output power to the X-axis deflection means and responsive to a rate of change of the X-axis deflection signals above the predetermined rate for switching to the slew mode to apply the slew mode output power to the X-axis deflection means, and other means having independent linear and slew modes of operation and operative in the linear mode for initially applying the linear mode output power to the Y-axis deflection means and responsive to a rate of change of the Y-axis deflection signals above the predetermined rate for switching to the slew mode to apply slew mode output power to the Y-axis deflection means.

6. An electromagnetic deflection display system as described by claim 1, including:

means for providing display bright up signals; an means for applying the display bright up signals to the display means.

* * * * *

UNITED STATES PATENT OFFICE
CERTIFICATE OF CORRECTION

PATENT NO. 3,863,099

DATED January 28, 1975

INVENTOR(S) ABNER OWENS, JR.

It is certified that error appears in the above-identified patent and that said Letters Patent are hereby corrected as shown below:

On the cover sheet [73] the assignee's name should read --The Bendix Corporation--.

Signed and Sealed this

*twenty-second* Day of *July 1975*

[SEAL]

*Attest:*

RUTH C. MASON
*Attesting Officer*

C. MARSHALL DANN
*Commissioner of Patents and Trademarks*